US012704440B2

(12) United States Patent
Ramnani et al.

(10) Patent No.: US 12,704,440 B2
(45) Date of Patent: Aug. 11, 2026

(54) DEVICE WITH JIG FOR CUTTING CLAY MINERAL SLIDES ORIENTED FOR ANALYSES OF THE X-RAY DIFFRACTOMETRY TECHNIQUE

(71) Applicant: PETRÓLEO BRASILEIRO S.A.—PETROBRAS, Rio de Janeiro (BR)

(72) Inventors: Camila Wense Ramnani, Rio de Janeiro (BR); Renata Alves Mota, Rio de Janeiro (BR); Fabiano Galdino Leal, Rio de Janeiro (BR); Yaro Moises Parizek Silva, Rio de Janeiro (BR)

(73) Assignee: PETROLEO BRASILEIRO S.A.—PETROBRAS, Rio de Janeiro (BR)

( * ) Notice: Subject to any disclaimer, the term of this patent is extended or adjusted under 35 U.S.C. 154(b) by 285 days.

(21) Appl. No.: 18/393,943

(22) Filed: Dec. 22, 2023

(65) Prior Publication Data

US 2024/0210284 A1 Jun. 27, 2024

(30) Foreign Application Priority Data

Dec. 27, 2022 (BR) .......................... 1020220267243

(51) Int. Cl.
*G01N 1/06* (2006.01)
*G01N 23/20* (2018.01)

(52) U.S. Cl.
CPC ......... *G01N 1/06* (2013.01); *G01N 23/20075* (2013.01)

(58) Field of Classification Search
CPC ....... G01N 23/20025; G01N 23/20075; G01N 23/20; G01N 2001/288; G01N 2001/2866; G01N 2001/366; G01N 1/31; G01N 1/2813; G01N 24/081; H01J 2237/201; H01J 2237/2007
See application file for complete search history.

(56) References Cited

U.S. PATENT DOCUMENTS 2,317,329 A * 4/1943 Mclachlan, Jr. ............................. G01N 23/20025 378/75
3,518,752 A * 7/1970 Lentz .................. H05K 13/021 29/25.35
4,115,689 A * 9/1978 Won ......................... G21K 5/08 378/49
4,278,883 A * 7/1981 Hathaway ........ G01N 23/20025 378/79

(Continued)

*Primary Examiner* — Tran M. Tran
(74) *Attorney, Agent, or Firm* — Kilpatrick Townsend & Stockton LLP

(57) ABSTRACT

A device includes a jig for cutting clay mineral slides oriented for analyses of the X-ray diffractometry technique. The device speeds up the preparation of the clay mineral slide and guarantees the standardization of the final size of the material, for subsequent fitting into the holder of the manufacturer of the X-ray Diffraction (XRD) equipment. The device can be manufactured from polyacetal and includes at least one fixing screw, at least one orientation guide base and at least one removable holder. The device can be fully applied to any XRD analysis that is performed on glass slides. Examples of interested parties are the mining, cement and oil industries and other fields of exploration of mineral resources.

10 Claims, 4 Drawing Sheets

(56) References Cited

U.S. PATENT DOCUMENTS 4,341,735 A * 7/1982 Seifried .................. B26D 7/32 83/167
4,534,536 A * 8/1985 Nelson .................... G01N 1/32 249/105
5,047,190 A * 9/1991 Jenks ................... B29C 43/361 264/109
5,499,566 A * 3/1996 Endo ..................... B23D 31/04 83/636
5,550,033 A * 8/1996 Krumdieck ............. G01N 1/36 425/117
5,862,729 A * 1/1999 Rolon ................... G01N 1/286 83/30
6,274,088 B1 * 8/2001 Burbaum ............. B01L 3/5025 422/503
6,406,670 B1 * 6/2002 Earley .................. B01L 3/5085 53/247
6,507,636 B1 * 1/2003 Lehmann ................. C30B 7/00 378/208
6,537,826 B1 * 3/2003 Horigane .............. G01N 1/286 422/504
6,677,162 B1 * 1/2004 Wendelbo ........... B01J 19/0046 422/534
6,968,037 B2 * 11/2005 Rosso ................ B01L 3/50255 378/71
7,098,454 B2 * 8/2006 Kuhlman ................ G01N 1/28 250/306
7,375,807 B2 * 5/2008 van den Brink ....... G01N 1/286 356/244
7,410,804 B2 * 8/2008 Wendelbo ........ G01N 23/20025 222/174
7,854,899 B2 * 12/2010 Hewitt ...................... B26F 1/14 422/562
8,018,588 B2 * 9/2011 Wernicki ............... G02B 21/34 356/244
8,714,955 B2 * 5/2014 Vincent ..................... B22F 3/03 419/61
8,915,154 B2 * 12/2014 Ross ...................... G01N 1/286 73/864.91
9,087,673 B2 * 7/2015 Barrett .................... H01J 37/20
9,341,549 B2 * 5/2016 Lakshtanov ......... G01N 23/046
9,476,810 B2 * 10/2016 Gottlieb ................. G01N 1/286
9,482,603 B2 * 11/2016 Brousmiche .......... B01L 3/5021
9,492,820 B2 * 11/2016 Reed ................. B01L 3/502715
9,671,385 B2 * 6/2017 Buhac ...................... G01N 9/00
10,379,009 B2 * 8/2019 Fenner ..................... G01N 1/10
10,983,031 B2 * 4/2021 Kuh ....................... C12M 25/14
11,525,790 B2 * 12/2022 Ito .................... G01N 23/20025
12,158,461 B2 * 12/2024 Carbo .................... G01N 33/24
12,360,099 B2 * 7/2025 Ravansari .............. G01N 33/24
12,480,896 B2 * 11/2025 Segal ................. G01N 23/2206
2003/0039788 A1 * 2/2003 Harris ................... A47J 47/005 428/40.1
2003/0068829 A1 * 4/2003 Giaquinta .............. G01N 23/20 436/173
2016/0054241 A1 * 2/2016 Campbell ............ G01N 23/223 252/408.1
2024/0000412 A1 * 1/2024 Lazarev ................. G01N 23/20
2024/0337569 A1 * 10/2024 Abukhiran ............... G01N 1/36

* cited by examiner

DEVICE WITH JIG FOR CUTTING CLAY MINERAL SLIDES ORIENTED FOR ANALYSES OF THE X-RAY DIFFRACTOMETRY TECHNIQUE

FIELD OF THE INVENTION

The present invention falls within the technical field of oil and gas, more specifically related to the creation of geological models and reduction of the operational risk in companies that prospect mineral resources, even more specifically, in chemical-mineralogical characterization of clay minerals, and refers to a device with a jig for cutting slides of clay minerals oriented for analyses of the X-ray diffractometry technique.

BACKGROUNDS OF THE INVENTION

The chemical-mineralogical characterization of clay minerals is fundamental for building geological models and reducing operational risk in companies that prospect for mineral resources. Specifically for the oil and gas industry, the study of clay minerals is a valuable tool for the analysis of petroleum systems (basin depositional model, diagenesis, porous system, etc.) and to help solving unforeseen events during the drilling phases (reactivity to drilling fluid, swelling, etc.) and production (damage to the formation, migration of fines, etc.).

Clay minerals are phyllosilicates that occur in sizes less than two micrometers, and are therefore imperceptible to optical microscopes and usually identified by the analytical technique of X-ray diffractometry (XRD). In turn, the XRD technique allows the characterization of crystalline structures and, based on them, the identification of minerals.

During preparation for XRD analysis, each sample is placed in a thin layer on the glass slide for microscopy. The slides are supplied with a thickness of 1.00 to 1.20 mm, for an approximate size of 76×26 mm and need to be adjusted in length to fit into the holder. The length of the slides must be standardized and allow them to fit into a specific holder to, finally, continue the analysis on the equipment.

The slides are then positioned on the plastic holder and subjected to the XRD analysis. Each prepared slide is subjected to a sequence of investigations under different conditions (natural, solvated with ethylene glycol and calcined) that characterize the clay minerals according to their crystalline structure, their expansive properties and their structural changes upon heating. The set of results therefore allows to identify the clay minerals present in the rock sample.

The slide containing the sample is arranged in a specific plastic holder, manufactured by the equipment manufacturer. Each slide is manually and individually cut before fitting into the holder. Size standardization, cutting linearity, physical preservation of the slides and preparation speed are challenges. Currently, the slide cuts are made using a diamond tip cutter, whose cutting line is determined by manual marking on the slide surface and that must comply with the dimensions of the holder.

Eventually, the slides become damaged or have different sizes, which leads to inadequate positioning in the holder or the need for new size adjustment. Therefore, the need to standardize the size of clay mineral slides and promote the integrity of the prepared sample is directly linked to the delivery time of XRD results and indirectly to the company business. The development of a device suitable for cutting slides allows for economies of scale in the preparation and delivery time of results.

In view of this, and in order to solve the technical problem described previously, the present invention proposes the development of a device with a jig for cutting slides of clay minerals oriented to analysis of the X-ray diffractometry technique, the main advantages including accelerating the step of preparing slides for clay minerals, standardizing the length of the slides that will be fixed to the holder of the diffractometer equipment and mitigating rework in the preparation of material containing clay minerals. Financially, the annual reduction can be at least R$93.3 thousand with dedicated time and increased productivity of the clay mineral characterization service using XRD.

STATE OF THE ART

Document FR1430993A is part of the general state of the art, and describes a process for preparing a rock sample from rock powder intended for diffractometric analysis caused mainly by X-rays and a device for carrying out the process. It is known that diffraction analysis due to rock crystals can be considerably erroneous due to the preferential orientation of acicular or phyllitetal crystals. However, the similarities with the present invention are based only on the fact that it is also a clay mineral sample preparation solution for XRD, but does not include a device structure exactly as found in the present invention.

In turn, document CN215492677U is also part of the general state of the art and protects a sampling device applying the XRD technique, which comprises a bottom plate, a base plate and a modeling mold; the base plate is arranged on the bottom plate, and a surface of the base plate, which is spaced away from the bottom plate, comprises an operating surface made of graphite material. However, the similarities with the present invention are based only on the fact that it is also a sample preparation device for XRD, but it does not mention the application in clay minerals nor does it include a device structure exactly as found in the present invention.

Document U.S. Pat. No. 4,278,883A, which is also part of the general prior art, describes a sample assembly set for use with an X-ray diffractometer. The set includes a holder with an opening extending therethrough, an insert for engaging the holder through its opening, a substrate filter layer, and the exposed sample layer mounted on the filter. The main objective of the document is an improved sample holder for use with an X-ray diffractometer. More specifically, it is a holder designed for a sample that is classified as an oriented aggregate powder diffraction sample. Therefore, the focus device of the present invention is applied for a purpose different from the device mentioned in the patent, which aims at preparing slides and the aforementioned document aims at packaging rock powder.

Document U.S. Pat. No. 9,683,950B2 is part of the general state of the art, wherein the present invention is included, but it only refers to a set for handling XRD samples. The sample handling set facilitates a sample holding cell used for XRD analysis. The set keeps the sample cell in an upright position during the sample loading and analysis phases. However, it should be noted that the device mentioned in the aforementioned document has geometry, objective, materials and application radically different from that proposed in the present invention.

Finally, document CN1800839A describes a qualitative and quantitative analysis for X-ray diffraction minerals, wherein the X-ray diffraction phase analysis sample holder comprises a single crystal piece of silicon in the following base structure, a base structure and a dust transport film attached to said single piece. However, it should be noted that the device mentioned in the aforementioned document is a holder for samples, which presents advantages in subsequent analysis by XRD, having little relationship with the device of the present invention that aims at preparing slides.

In view of the disclosure, it is noted that the present invention has the technical advantages of standardizing the cutting and preparation of slides containing clay minerals, reducing grooves and damage to the material. Furthermore, the present invention aims at obtaining slides that fit perfectly into the sample holder device used for XRD equipment from the manufacturer Bruker®. Due to this perfect fit, it is possible to obtain results with lower measurement errors and more reliable characterization of clay minerals. Regarding the reduction of grooves and damage to the material, it is worth noting that the slides are thin and have a high risk of breakage when cutting by other means, in addition to loss of the clay preparation material. In the case of a poorly executed cut by other means, the grooves make it impossible to use the slide due to the loss of homogeneity of the clay material on the slide, resulting in associated financial loss.

BRIEF DESCRIPTION OF THE INVENTION

The present invention describes a device with a jig for cutting clay mineral slides oriented for analyses of the X-ray diffractometry technique. The device speeds up the preparation of the clay mineral slide and guarantees standardization of the final size of the material, for subsequent fitting in the holder of the manufacturer of the X-ray Diffraction (XRD) equipment. The device of the present invention can be manufactured from polyacetal and basically comprises at least one fixing screw, at least one orientation guide base and at least one removable holder. The device can be fully applied to any XRD analysis that is performed on glass slides. Examples of interested parties are the mining, cement and oil industries and other fields of exploration of mineral resources.

BRIEF DESCRIPTION OF THE FIGURES

In order to complement the present description and obtain a better understanding of the features of the present invention, and in accordance with a preferred embodiment thereof, in annex, a set of figures is presented, where in an exemplified, although not limiting, manner, its preferred embodiment is represented.

DETAILED DESCRIPTION OF THE INVENTION

The present invention refers to a device with a jig for cutting slides of clay minerals oriented for analyses of the X-ray diffractometry (XRD) technique. The device speeds up the preparation of the clay mineral slide and guarantees the standardization of the final size of the material, for later fitting into the X-ray Diffraction equipment manufacturer holder.

Figure 1:
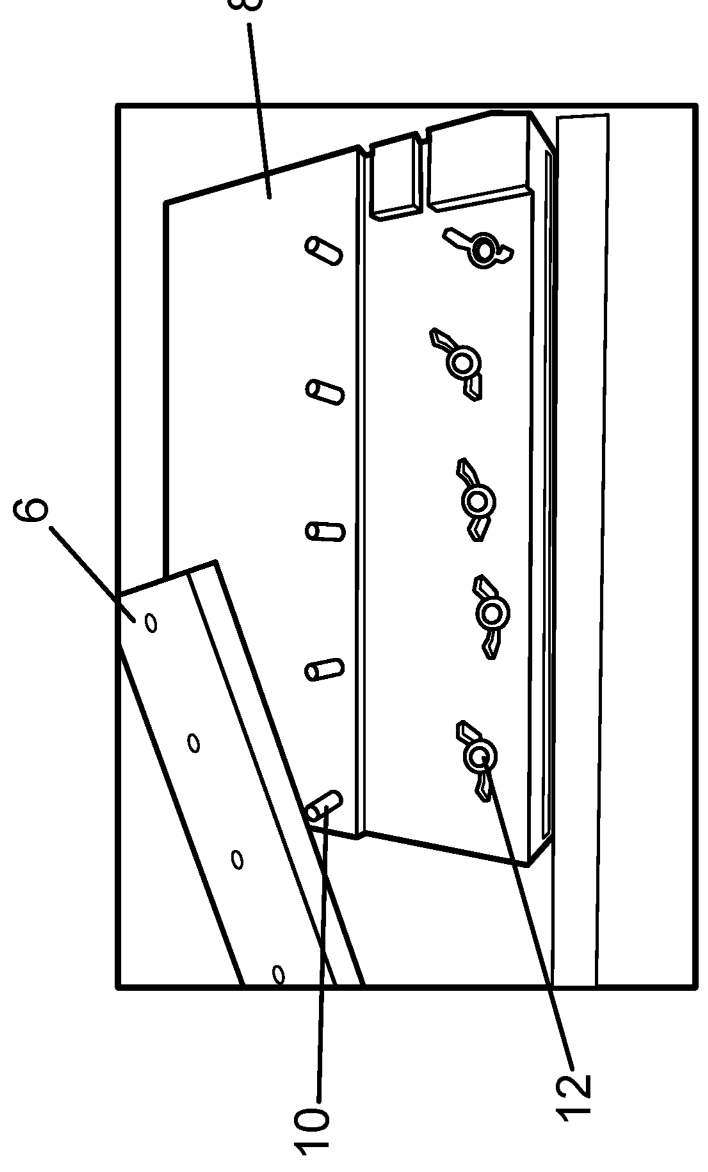
FIG. 1 shows the device in its disassembled form, according to a preferred embodiment of the present invention.
Figure 2:
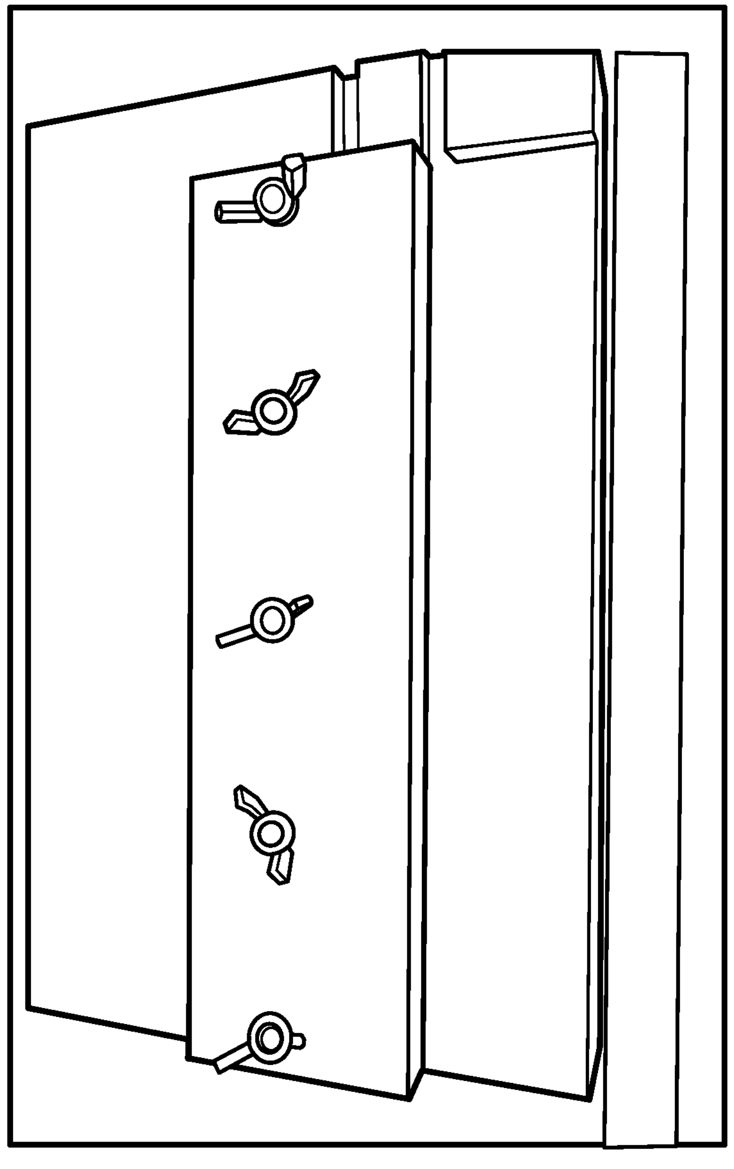
FIG. 2 shows the device in its assembled form, according to a preferred embodiment of the present invention.
Figure 4:
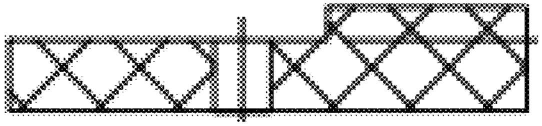
FIG. 4 shows the side view of the device highlighting the differences in height between the base and the removable holder, according to a preferred embodiment of the present invention.

According to FIGS. 1 and 2, the device of the present invention can be preferably manufactured from polyacetal and comprises a rectangular shape at least 60 mm in width and 225 mm in length. The complete device has two parts that are fixed together, containing: i) orientation guide base (8), in acetal, with dimensions 60×225×12 mm (Width×Length×Height), with an unevenness of 3.8 mm (as shown in the side view of FIG. 4). ii) removable holder (6), in acetal, for fixing the slides, containing holes for the passage of fixing screws (10) and wing nuts (12), which can be preferably manufactured in metallic alloy.

The slides are positioned at the unevenness of the orientation guide base (8); next, the removable holder (6) is positioned above them, and the set is fixed with the aid of the fixing screws (10) and wing nuts (12). After checking the fixation of the slides and correct positioning of the cutting length, the slide fraction containing the clay mineral sample is removed, preferably with a diamond cutter, resulting in 25×26 mm (L×D) of useful material (dimensional features of standardized samples).

Figure 3:
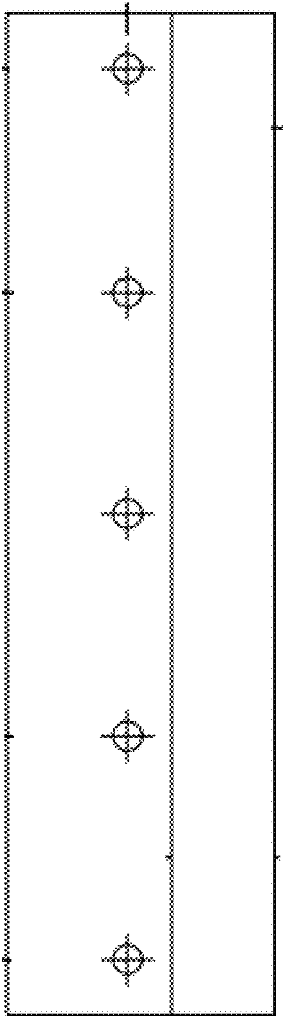
FIG. 3 shows the top view of the device highlighting the base and holes, according to a preferred embodiment of the present invention.

As shown in the top view of FIG. 3, the holes in the orientation guide base (8) and removable holder (6) are spaced between 49.7 and 50.2 mm apart. The holes have a diameter of at least 6.5 mm. The number of fixing screws (10) and wing nuts (12) is preferably the same.

Compatibility tests were carried out between slides containing clay minerals and the cutter with jig, observing the adequate standardization in the slide cuts and an eight-fold increase in productivity. The device allows the cutting of 8 (eight) slides at a time, equally sized with a width and depth of 25×26 mm, in addition to promoting total fixation of the set of slides, which guarantees a linearized cut and always in the correct position. No additional burrs, scratches or roughness were observed that would make the final slide unviable for tests using an X-ray diffractometer (XRD).

Considering the total time of two minutes to prepare each slide, and the time reduction of 87% compared to the traditional preparation of eight slides, the financial result can reach R$93.3 thousand annually (7 units×2/60 min×400 R$/units×1,000 units/year) in direct costs with reduced time dedicated to this step of the process.

If the slide is lost for samples with insufficient mass and unavailable in the laboratory, there is a risk of financial losses corresponding to the rework of preparing the slide and its prior treatment (extraction of oily fluids and salt), equivalent to losses of 100 days waiting for the final result.

In this case, considering the implications for the business, wherein the response from clay minerals is awaited to define an operational exploration or exploitation strategy, it is possible to critically estimate losses of US$500 thousand per day in rental of the exploration rig.

Those skilled in the art will value the knowledge presented herein and will be able to reproduce the invention in the presented embodiments and in other variants, encompassed by the scope of the attached claims.

The invention claimed is:

1. Device A device for preparing analyses of samples or slides of clay minerals from slides of clay materials in the for use with an X-ray diffractometry technique, the device comprising:

an orientation guide base comprising an unevenness defined by a difference in height between a first portion and a second portion of the orientation guide base, the unevenness extending along a length of the orientation guide base; and a removable holder for maintaining a position of slides of clay minerals relative to the unevenness of the orientation guide base, the removable holder comprising holes extending through the removable holder and spaced along a length of the removable holder that is parallel to the length of the orientation guide base, wherein the orientation guide base and the removable holder are assemblable together via screws extending through the holes of the removable holder and corresponding holes of the orientation guide base extending through the orientation guide base.

2. The device according to claim 1, wherein the orientation guide base and the removable holder comprise preferably manufactured from polyacetal.

3. The device according to claim 1, wherein the device is sized and shaped for preparing the samples of clay minerals comprising dimensions of 25 mm in length and 26 mm in width.

4. The device according to claim 1, wherein the orientation guide base comprises at least 60 mm in width and 225 mm in length.

5. The device according to claim 1, wherein the removable holder is positioned above the orientation guide base adjacent to the unevenness in an assembled configuration.

6. The device according to claim 1, wherein the screws maintain the orientation guide base relative to the removable holder via corresponding wing nuts.

7. The device according to claim 1, wherein the device is sized and shaped for use with a diamond cutter for cutting the samples from the slides of clay materials after positioning the slides of the clay materials between the orientation guide base and the removable holder.

8. The device according to claim 1, wherein the holes of the removable holder and the corresponding holes of the orientation guide base are spaced between 49.7 and 50.2 mm apart.

9. The device according to claim 1, wherein the holes of the removable holder and the corresponding holes of the orientation guide base comprise a diameter of at least 6.5 mm.

10. The device according to claim 6, wherein a number of screws and a number of wing nuts are the same.

* * * * *